Sept. 1, 1931.  L. J. BLACK  1,821,874

SWIVEL

Filed Aug. 7, 1928  2 Sheets-Sheet 1

Inventor
L. J. Black
By
Attorney

Sept. 1, 1931.　　　　L. J. BLACK　　　　1,821,874
SWIVEL
Filed Aug. 7, 1928　　　2 Sheets-Sheet 2
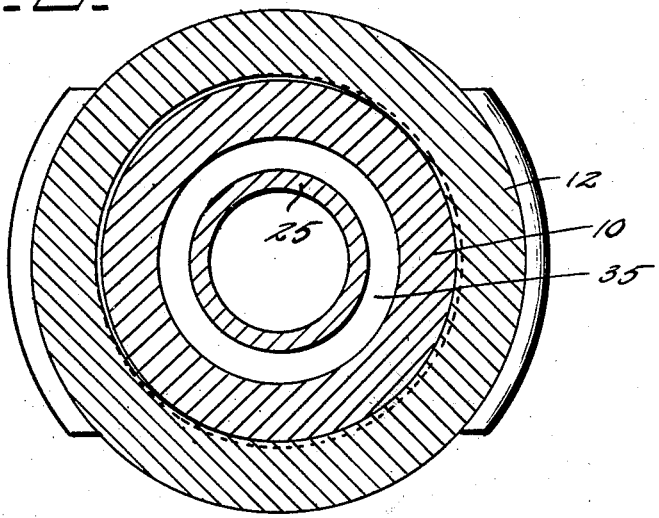
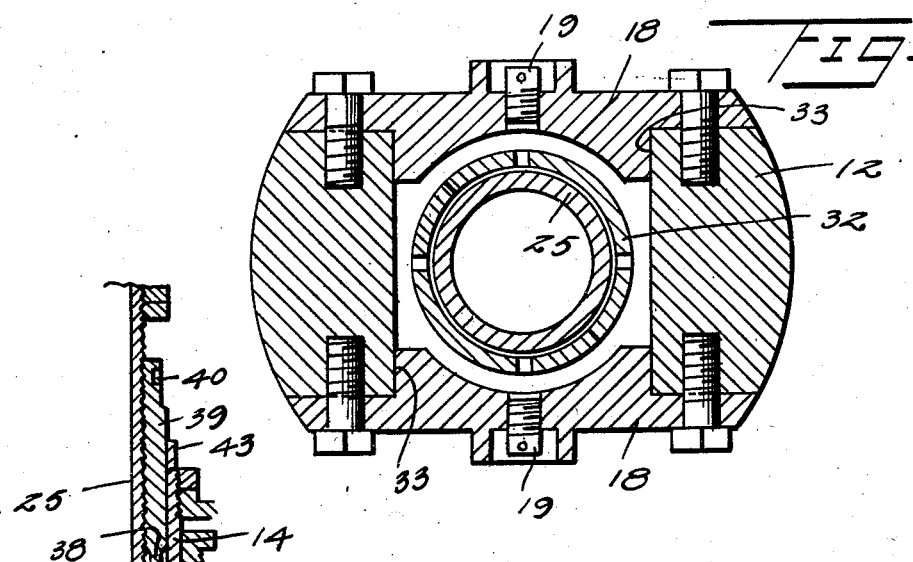
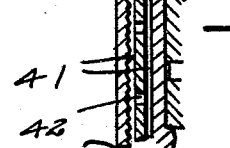
Inventor
L. J. Black
By Frederick S. Hill
Attorney Patented Sept. 1, 1931

1,821,874

UNITED STATES PATENT OFFICE

LEE J. BLACK, OF BEAUMONT, TEXAS

SWIVEL

Application filed August 7, 1928. Serial No. 297,991.

This invention relates to swivels and more particularly to swivels for use in conjunction with rotary well drilling apparatus.

As is well known to those familiar with the well drilling art, the rotary swivel constitutes at once a means for supporting the drill pipe of rotary drilling apparatus and for conducting water to this drill pipe for use in flushing cuttings formed by the drill. The general structure provided comprises a supported casing to which is fixed a water feed pipe or gooseneck and a swivel stem including a head which is rotatably mounted in the casing in thrust bearings. The water is conducted to this swivel head, to which the drill pipe is connected directly or by a coupling, through a sleeve rigid to the feed pipe which extends thereinto. Packings are provided for preventing the water which is under considerable pressure and which contains a considerable amount of grit and mud from passing around this sleeve, so that it would escape and constantly drip upon the rotary table to cause damage thereto without consideration to the damage caused to the sleeve and head by the foreign substance carried to the bearing surfaces therebetween by this water. In the ordinary construction, two packings are provided, necessitating two adjustments to insure proper tightening of the connection to prevent the escape of water.

An attempt has been made to accomplish this result by the use of a single packing but has been unsuccessful, due to the fact that in order to install fresh packing at the joint, the entire swivel construction must be pulled apart in the packing operation. Accordingly, an important object of this invention is to provide a structure such that the dual packing between the sleeve and swivel stem may be retained and adjusted by a single operation without the necessity of dismantling any portion of the swivel and which is of such construction that packing may be renewed at any time in a very convenient manner and without tearing down the swivel or removing it from its connections with the drill pipe.

A further object of the invention is to provide a construction such that if the primary packing becomes faulty so that it permits escape of water thereby, the passage of this water will be resisted by lubricant stored under pressure in the packed space.

A still further object of the invention is to provide a structure which permits lubrication of the bearing surface between the swivel stem and sleeve throughout the length of such bearing surface and which will permit the use of roller bearings and other accessory friction reducing elements.

These and other objects I attain by the construction shown in the accompanying drawings, wherein for the purpose of illustration is shown a preferred embodiment of my invention and wherein:—

Figure 2 is a section on the line 2—2 of Figure 1;

Figure 3 is a section on the line 3—3 of Figure 1;

Figure 5 is a fragmentary sectional view illustrating a slightly modified mounting for the gland follower.

Figures 1, 4:
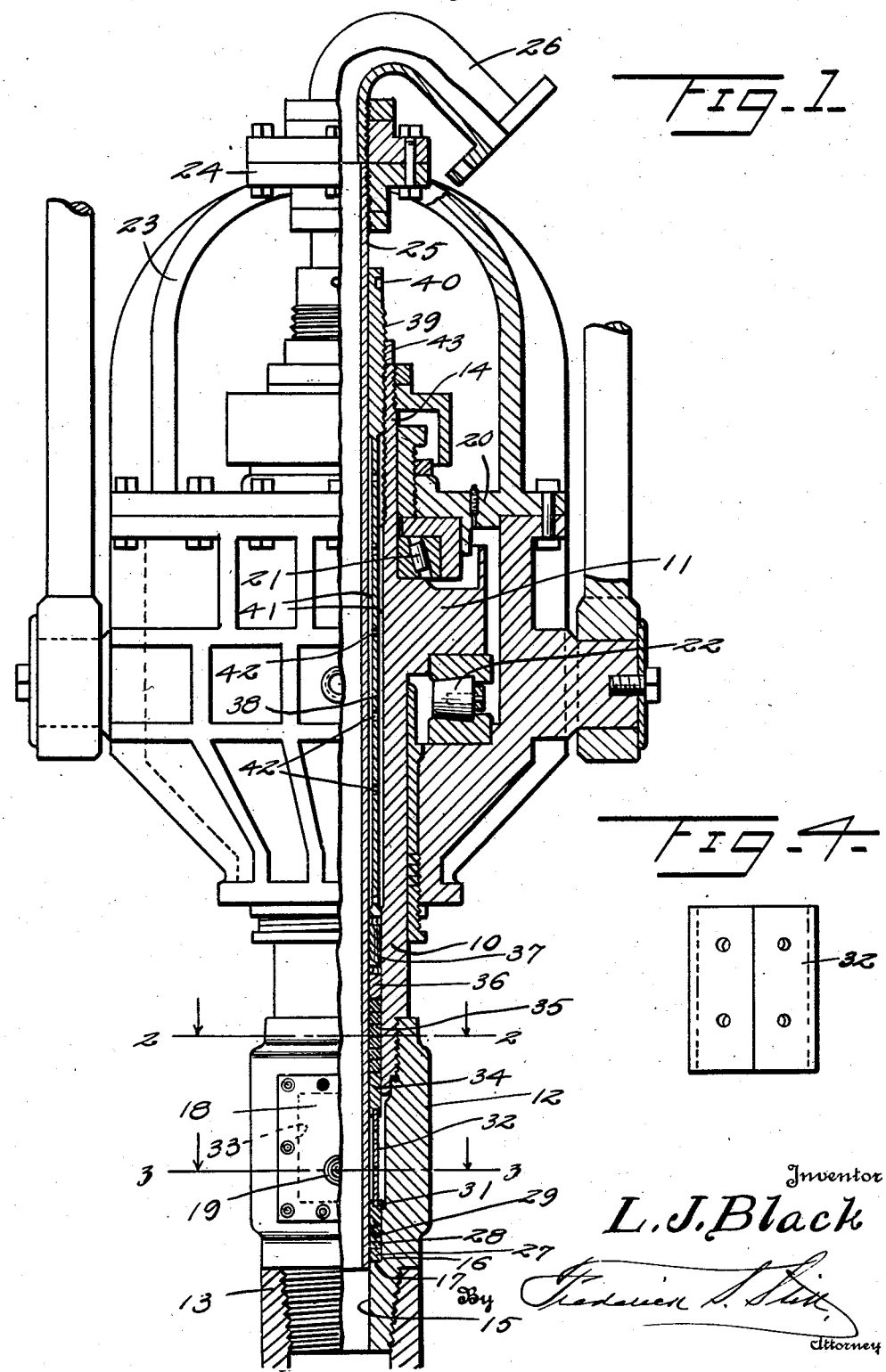
Figure 1 is a side elevation partially in section through a drilling swivel constructed in accordance with my invention.
Figure 4 is a side elevation of the sleeve.

Referring now more particularly to the drawings, the numeral 10 generally designates a swivel stem having at its upper end a head 11. The lower end of the stem is in the present instance shown as engaged with a coupling 12 constituting a means for connecting the drill stem 13 to the swivel. However, if desired, the coupling 12 might be omitted and the drill stem directly coupled to the swivel stem. Projecting upwardly from the head 11 is a flange 14, which is interiorly threaded, for a purpose hereinafter to appear. The swivel stem or rather the assembly produced by the combination of this stem with the coupling 12 in the present illustration has a primary bore 15 which, at a point immediately above the lower end of the assembly, is enlarged, as at 16, producing an upwardly facing shoulder 17. At a point spaced slightly above this shoulder, the wall of the assembly is provided with diametrically opposed removable plates 18, one or both of which is provided with means 19 whereby a lubricant under pressure may be introduced to the bore. The structure just recited constitutes the rotating portion of the swivel structure.

The stationary portion of this structure comprises a casing or trunnion block 20 receiving and housing the head 11 and thrust bearings 21 and 22 for centering and supporting the swivel stem and its supported load. Arising from and rigid to this casing is an arched casting 23 supporting a fitting 24 having means for receiving and securing in position a tube or hose stem 25. This tube 25 is of such length that it extends into the upper end of the primary bore of the swivel, so that from the upper end of the flange 14 to the shoulder 17, a space is formed between the sleeve and the wall of the enlarged portion of the bore of the stem. The head has also means for connecting thereto the usual gooseneck 26 through which slush is delivered to the tube 25.

In the space between the tube and the wall of the enlarged portion of the bore are arranged a junk ring 27, which seats upon the shoulder 17, packings 28 seating upon the junk ring and a follower 29 seating upon the packing. This follower has its upper surface grooved, as indicated at 31, and the groove receives the lower end of a vertically split sectional sleeve 32, the sections of which are of such size that they may be removed through the openings 33 formed by the removal of the plates 18. Seated upon the upper end of the sleeve is a similarly formed follower 34 upon which, in turn, are disposed packings 35 and a junk ring 36. Upon the upper end of the junk ring, a roller bearing 37 is preferably seated and the upper end of this bearing is abutted by a packing compressor sleeve 38 which, adjacent its upper end, is exteriorly threaded, as at 39, for engagement with the threads of the flange 14 and which, at its upper end, is adapted, as at 40, for engagement by a spanner or other wrench.

The sleeve 38 from a point immediately above its lower end to a point adjacent its upper end has its opposite faces relieved, as indicated at 41, so that they are in spaced relation to both the wall of the tube and the enlarged wall of the bore of the swivel. This portion of the sleeve is perforated at spaced intervals, as indicated at 42. A lock nut 43 is employed to seat against the upper end of the flange 14 and lock the sleeve in its adjusted positions. While I have above described the sleeve 38 as having its adjustable engagement with the flange 14, it will, of course, be obvious that if desired, this adjustable engagement could be with the tube 25, as suggested at 44 in Figure 5.

In the use of the device, when the swivel is installed, grease under pressure is inserted at 19, the pressure employed in inserting the grease being equal to the pressure at which the flushing fluid is forced through the tube 25 and the drilling string. It will be obvious that this pressure will act to prevent the entry of mud and slush to the space between the tube and the swivel stem and in event such fluid does enter this space, it must force the oil or grease before it in its upward travel, so that leakage would have to proceed to a considerable point before the mud would reach the bearings 37. In injecting the oil, the space about the relieved portion of the tube will be filled with oil or grease and this grease will be forced out in event of any leakage, thus indicating the necessity for repacking or tightening the connection. When repacking becomes necessary, it may be readily accomplished by removing the plates, backing off the sleeve 40 to relieve the follower ring and removing the sectional sleeve 32. With this sleeve removed, either follower ring can be shifted to allow access to the packing space for removal of the old packing and its replacement by a new packing. The enlarged bore portion of the coupling 12 is located between the packings 28 and 35. This bore portion and the openings 33 in the opposite sides of the coupling 12 provide access to that portion of the hose stem 25 that is located between the packings 28 and 35. During the removal thereof, the old packings are moved on to said accessible portion of the hose stem 25, and thereafter the packings are withdrawn through the openings 33. The enlarged bore portion and openings 33 also permit the new packings to be applied to this portion of the hose stem 25, and after such packings are applied to such portion of the hose stem they are moved to points beyond the enlarged bore portion and the openings. It will thus be understood that the enlarged bore portion and openings permit the old packings to be removed and new packings substituted therefore without separating the coupling 12 and hose stem 25 and also permits the removal of the old packings and the application of the new packings easily and quickly.

With the new packing in position, the rings are returned to their normal positions in engagement therewith and the sleeve 32 inserted, after which the sleeve 40 is forced downwardly until the packing is properly tightened. The plates 18 are then returned to their position and lubricant forced into the space, as above described.

It will be obvious that the structure just described provides a novel and efficient means permitting simultaneous adjustment of the packings and providing for replacement of the packings without the necessity of tearing down the swivel. It will also be obvious that the construction hereinbefore set forth is capable of a certain range of change and modification without materially departing from the spirit of the invention and I accordingly do not limit myself to such specific structure except as hereinafter claimed.

I claim:—

1. In a device of the character set forth, inner and outer tubular members rotatable one with respect to the other and arranged in radially spaced relation, one of said members being provided near one end thereof with an annular shoulder contacting with the other of said members, packing arranged between said members near one end thereof and resting upon said shoulder, a bearing arranged between said members and resting upon said packing, a compressor sleeve for said packing arranged between said members and out of contact therewith, said sleeve contacting at one end with the bearing and having its other end increased in thickness and contacting with said members and screw threadedly engaged with one of said members, said sleeve being provided between its ends with openings and accessible from said other end of said members for adjustment in the direction of said packing, and means carried by said outer member to permit lubricant to be forced into the packing and into the space between said members.

2. In a device of the character set forth, inner and outer tubular members rotatable one with respect to the other and arranged in radially spaced relation, one of said members being provided near one end with an annular shoulder contacting with the other of said members and said outer member being provided in its side with an opening, a removable closure for said opening, a packing arranged between said members and resting upon said shoulder, a spacer sleeve arranged between said members and consisting of sections removable through said opening, a second packing arranged between said members upon said spacer sleeve, a bearing arranged between said members upon said second packing, a sleeve arranged between said members in spaced relation thereof and contacting at one end with said bearing, the other end of said sleeve being increased in thickness and contacting with said members and screw threadedly engaged with one of said members and said sleeve being provided between its ends with openings, and means carried by said closure to permit lubricant to be forced into the packing and into the space between the said members.

3. In a device of the character set forth, inner and outer tubular members, packings located between said members in axially spaced relation, the bore of said outer member being enlarged between said packings and such member being provided in opposite sides thereof with openings registering with said enlarged bore portion, said enlarged bore portion and openings providing access to that portion of said inner member located between said packings and on to which said packings may be moved and then withdrawn through said openings, and said enlarged bore portion and openings permitting a fresh packing to be applied to said portion of said inner member and then moved to points thereon beyond said enlarged bore portion and openings, means preventing said packings from moving accidentally onto said enlarged bore portion, and removable closures for said openings.

4. In a device of the character set forth, inner and outer tubular members, packings located between said members in axially spaced relation, the bore of said outer member being enlarged between said packings and such member being provided in opposite sides thereof with openings registering with said enlarged bore portion, said enlarged bore portion and openings providing access to that portion of said inner member located between said packings and on to which said packings may be moved and then withdrawn through said openings, and said enlarged bore portion and openings permitting a fresh packing to be applied to said portion of said inner member and then moved to points thereon beyond said enlarged bore portion and openings, and a spacer sleeve located between and contacting with said packings to hold them against accidental movement onto said enlarged bore portion, said spacer sleeve being vertically split to provide sections removable through said openings, and removable closures for said openings.

In testimony whereof I affix my signature.

LEE J. BLACK.